United States Patent
Saito

(10) Patent No.: US 9,030,689 B2
(45) Date of Patent: May 12, 2015

(54) IMAGE PROCESSING APPARATUS, IMAGE PROCESSING SYSTEM, COMMUNICATION DEVICE, AND NON-TRANSITORY COMPUTER READABLE MEDIUM

(75) Inventor: Tomoaki Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 235 days.

(21) Appl. No.: 13/396,268

(22) Filed: Feb. 14, 2012

(65) Prior Publication Data
US 2013/0063758 A1 Mar. 14, 2013

(30) Foreign Application Priority Data

Sep. 13, 2011 (JP) ................................. 2011-199864

(51) Int. Cl.
*G06K 15/00* (2006.01)
*H04N 1/00* (2006.01)
*G06F 3/12* (2006.01)

(52) U.S. Cl.
CPC ........ *G06K 15/00* (2013.01); *H04N 2201/3246* (2013.01); *H04N 1/00307* (2013.01); *H04N 1/00854* (2013.01); *H04N 2201/0072* (2013.01); *H04N 2201/0094* (2013.01)

(58) Field of Classification Search
CPC ... G06K 15/22; G06K 15/225; G06K 15/005; G06K 15/007; G06K 2215/0082; G06K 15/00
See application file for complete search history.

(56) References Cited

U.S. PATENT DOCUMENTS

2008/0270516 A1* 10/2008 Ragnet et al. ................. 709/202
2010/0245931 A1*  9/2010 Sato .............................. 358/407
2010/0321718 A1* 12/2010 Mihira ......................... 358/1.14

FOREIGN PATENT DOCUMENTS

JP    2011-000868 A    1/2011
JP    2011-008564 A    1/2011

OTHER PUBLICATIONS

Office Action issued by Australian Patent Office in corresponding Australian Patent application No. 2012201603, dated Jul. 9, 2013.

* cited by examiner

*Primary Examiner* — Fred Guillermety
*Assistant Examiner* — Henok A Shiferaw
(74) *Attorney, Agent, or Firm* — Sughrue Mion, PLLC

(57) ABSTRACT

Provided is an image processing apparatus including a readout unit that reads out an image, a grant unit that grants a right to receive image information provided to a communication destination through a wireless communication, in response to a request from the communication destination, the image information representing the image read out by the readout unit, and a providing unit that provides the image information by transmitting the image information to the communication destination through the wireless communication, when the communication destination exercises the right granted by the grant unit in a state where a wireless communication connection to the communication destination is established.

20 Claims, 17 Drawing Sheets

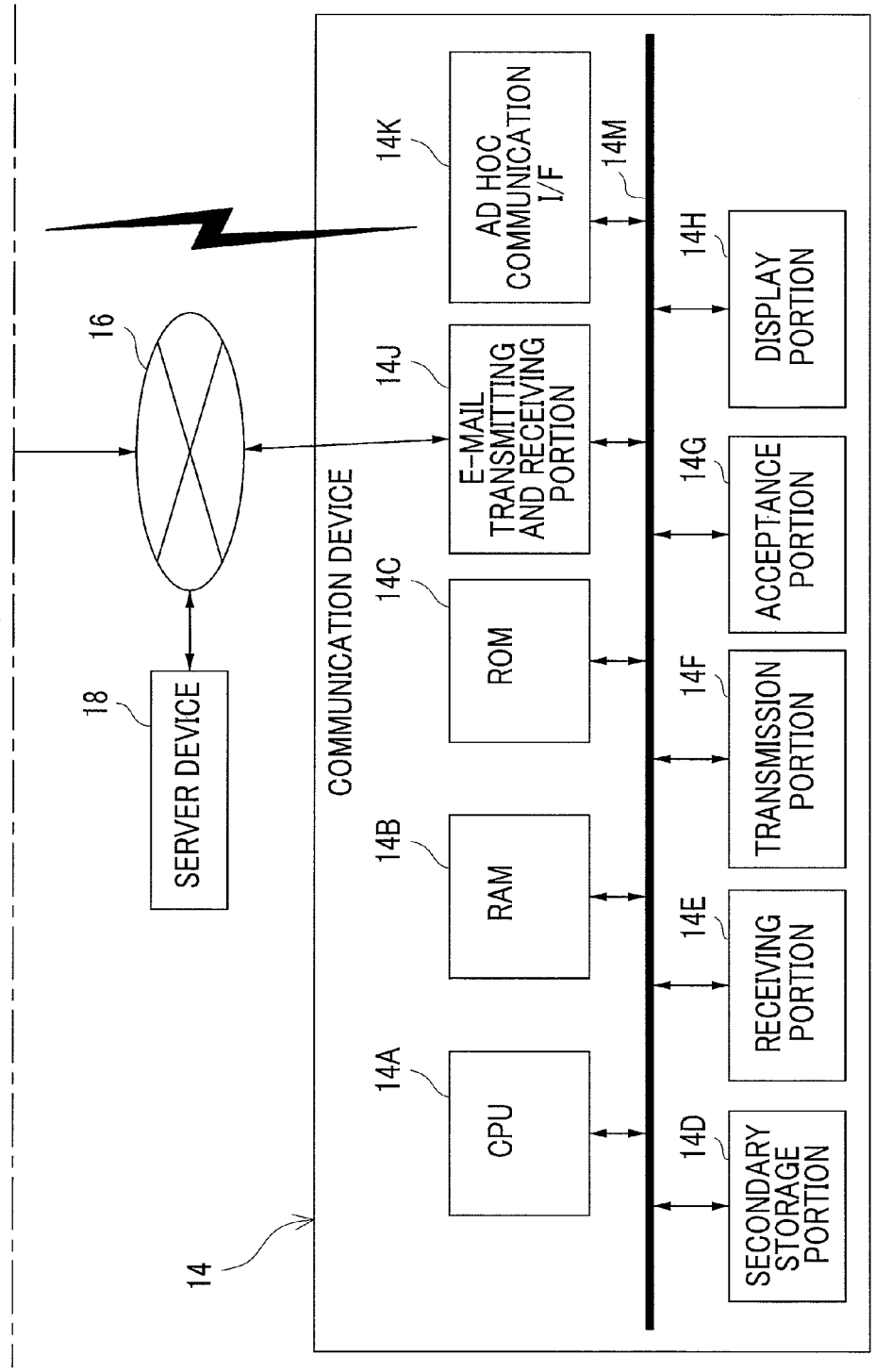

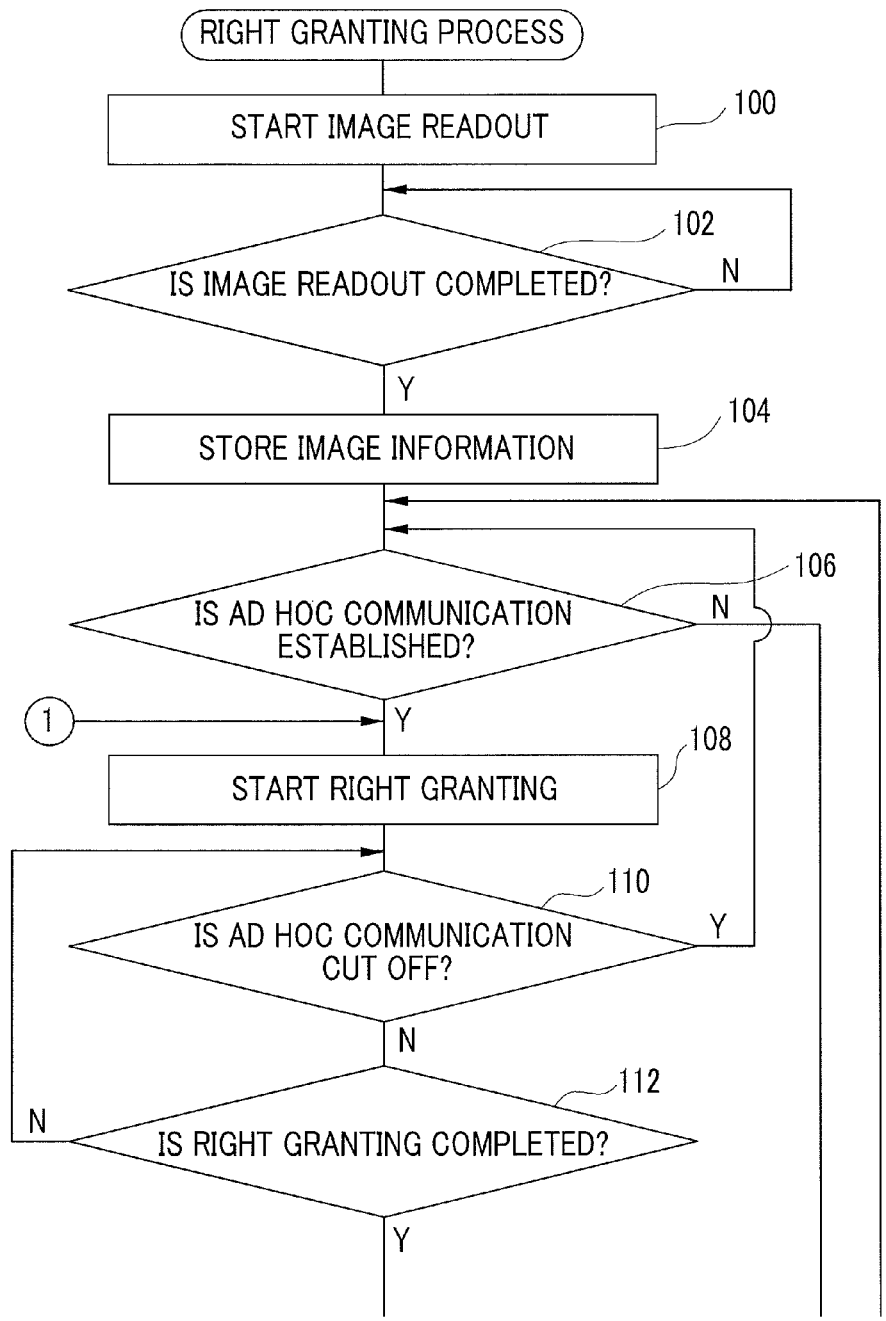

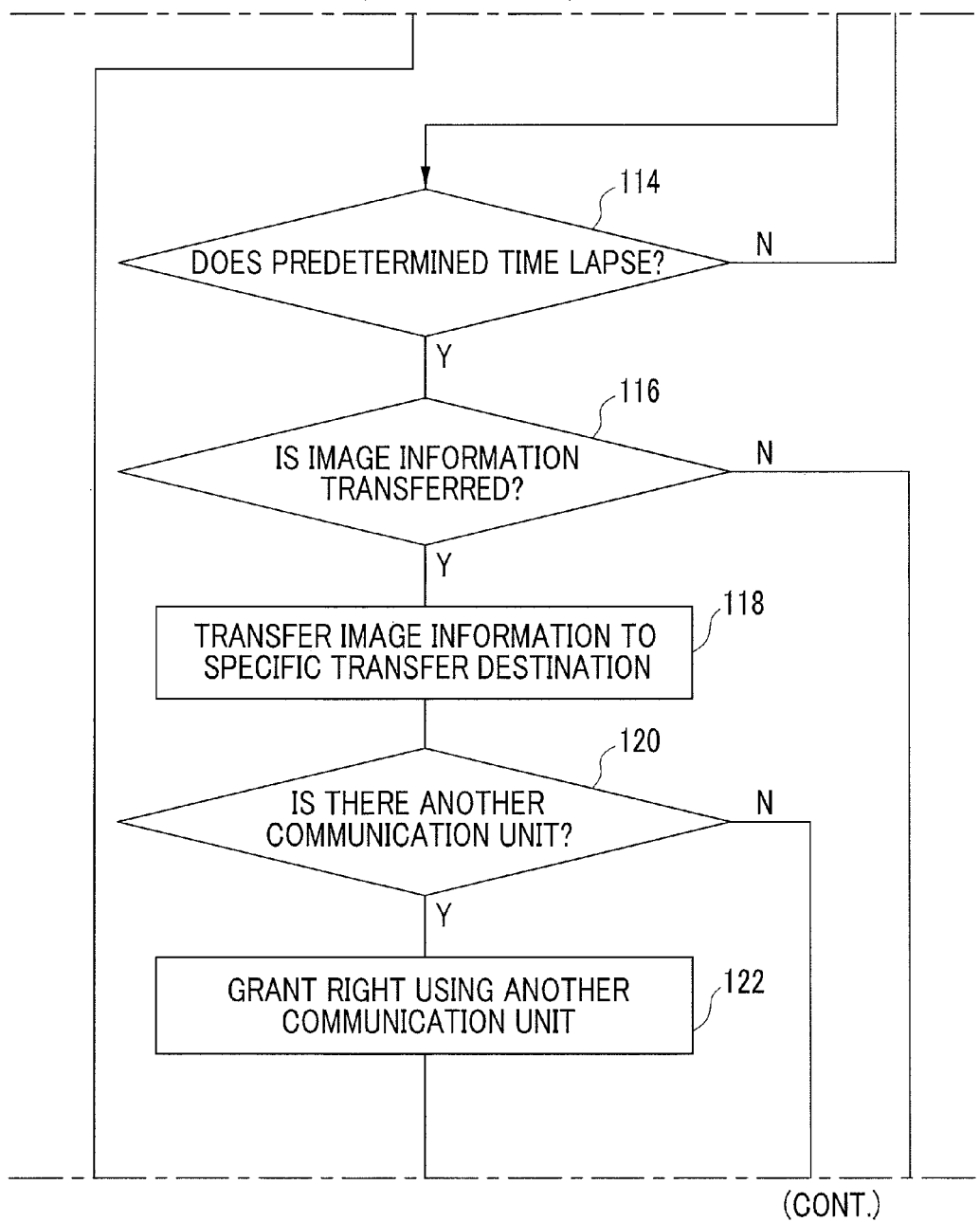

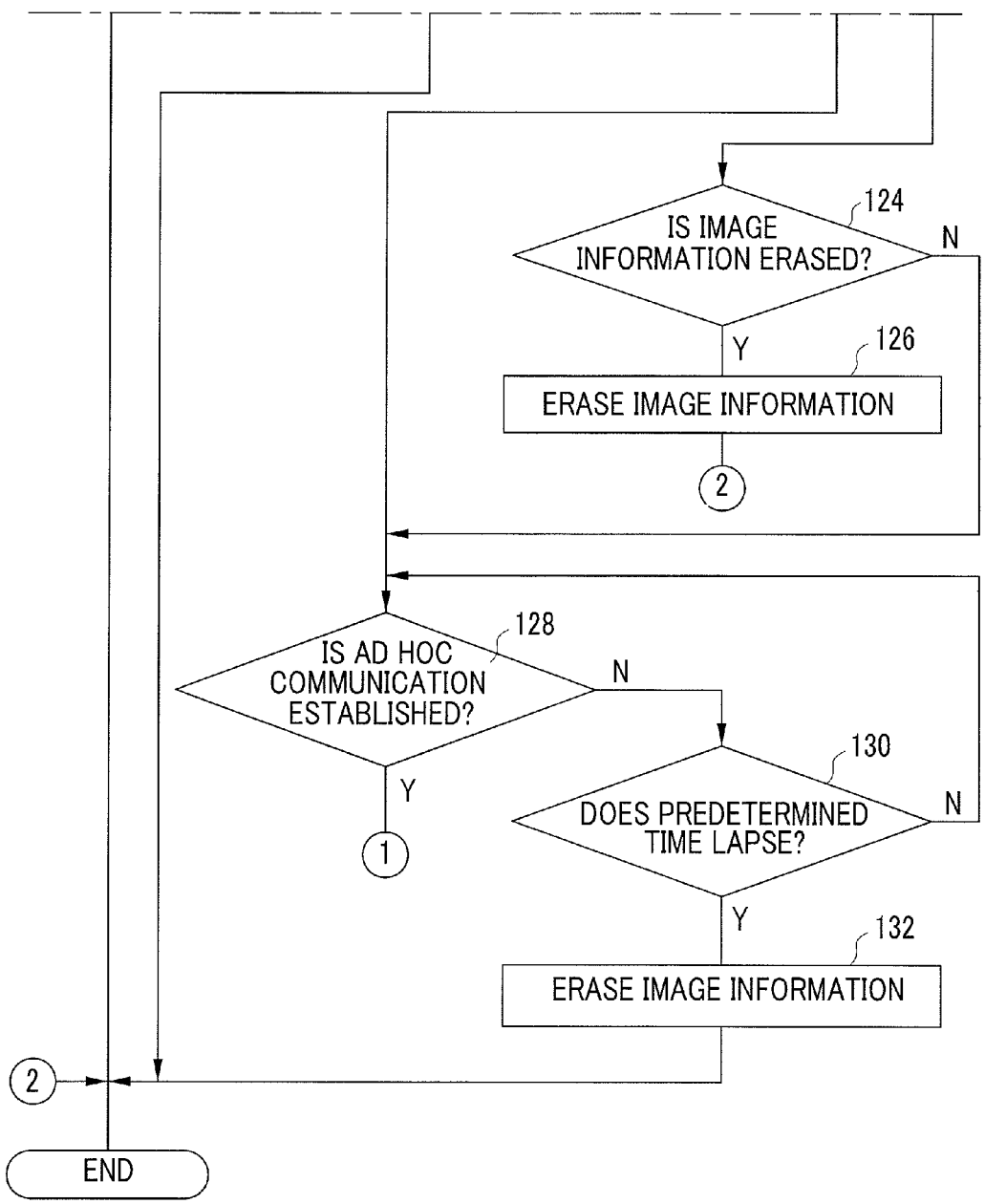

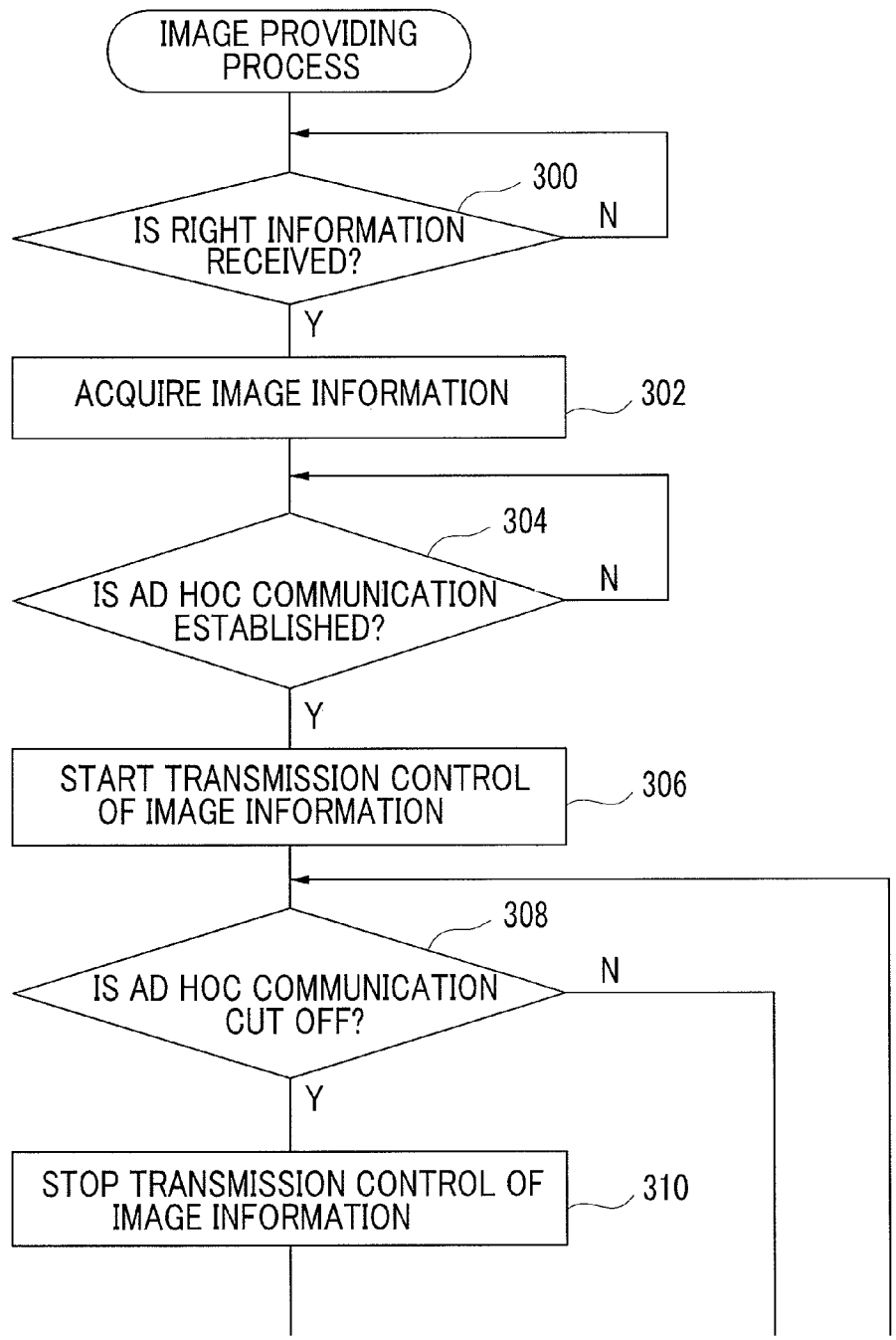

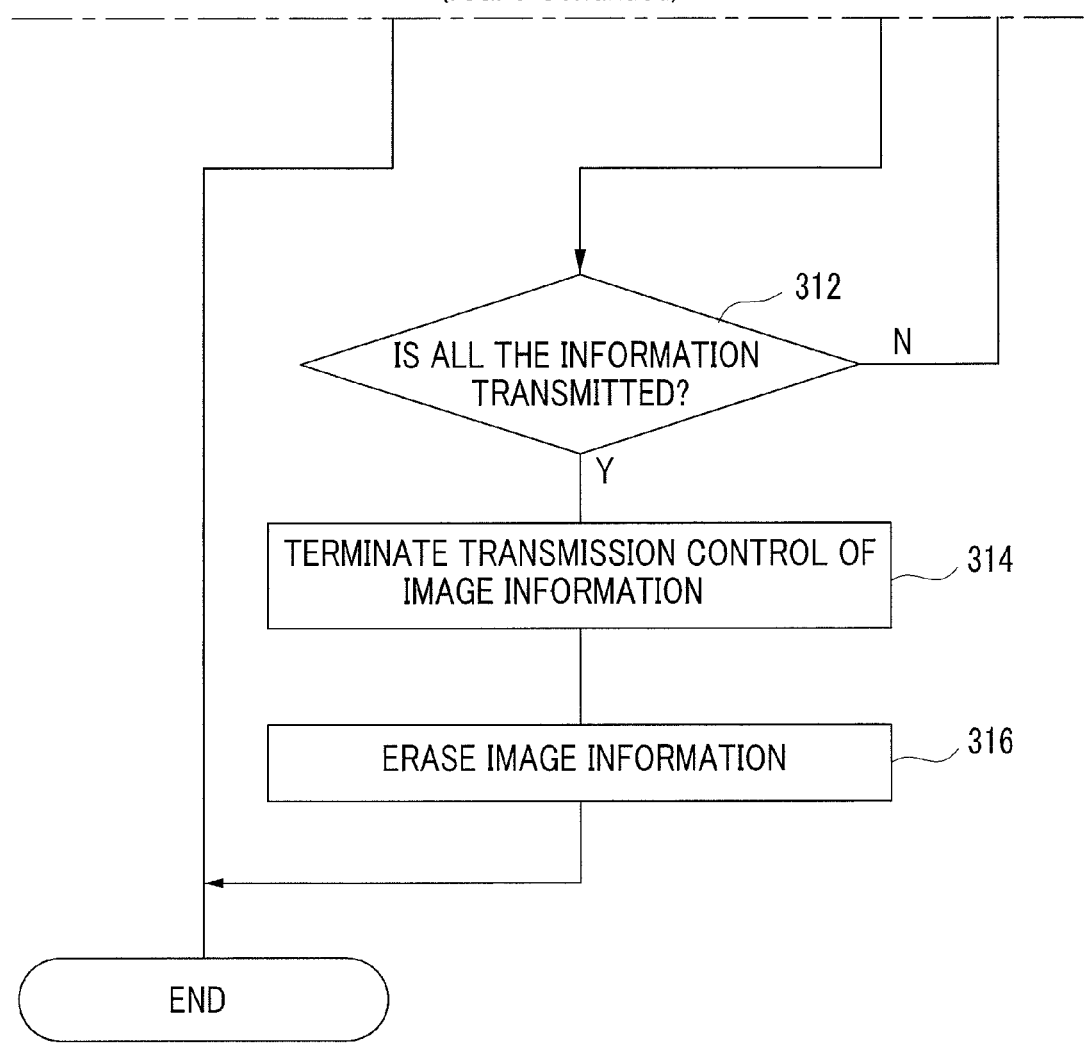

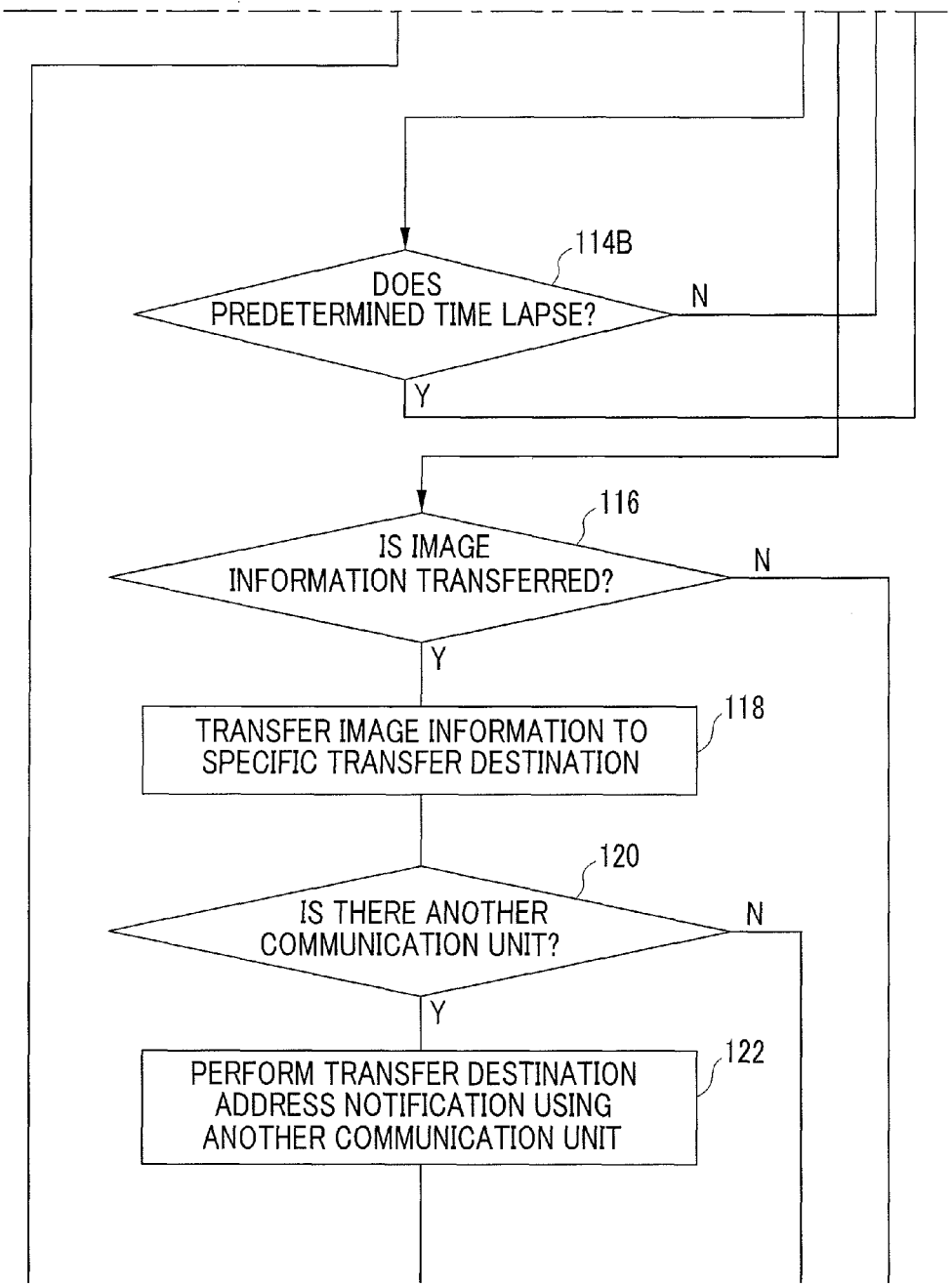

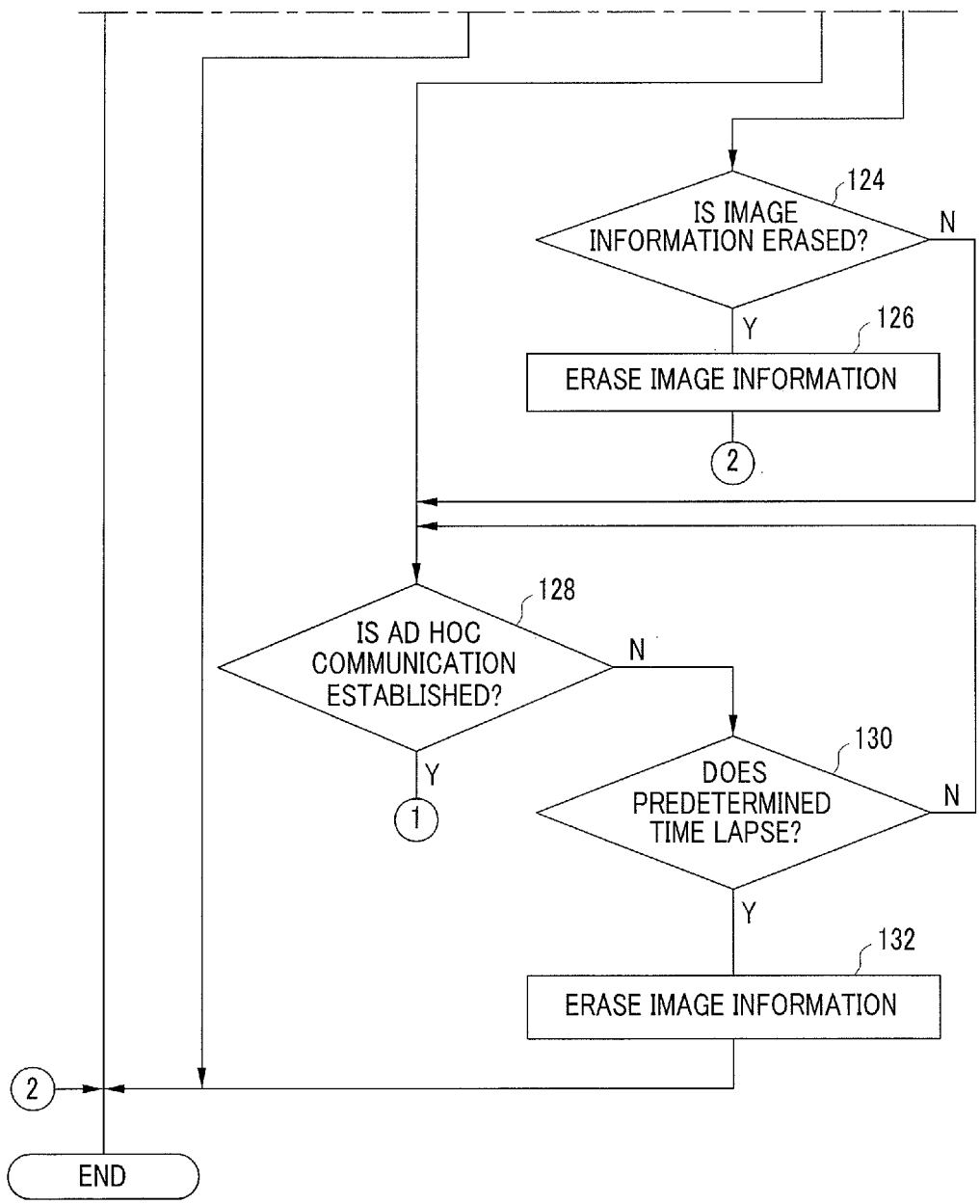

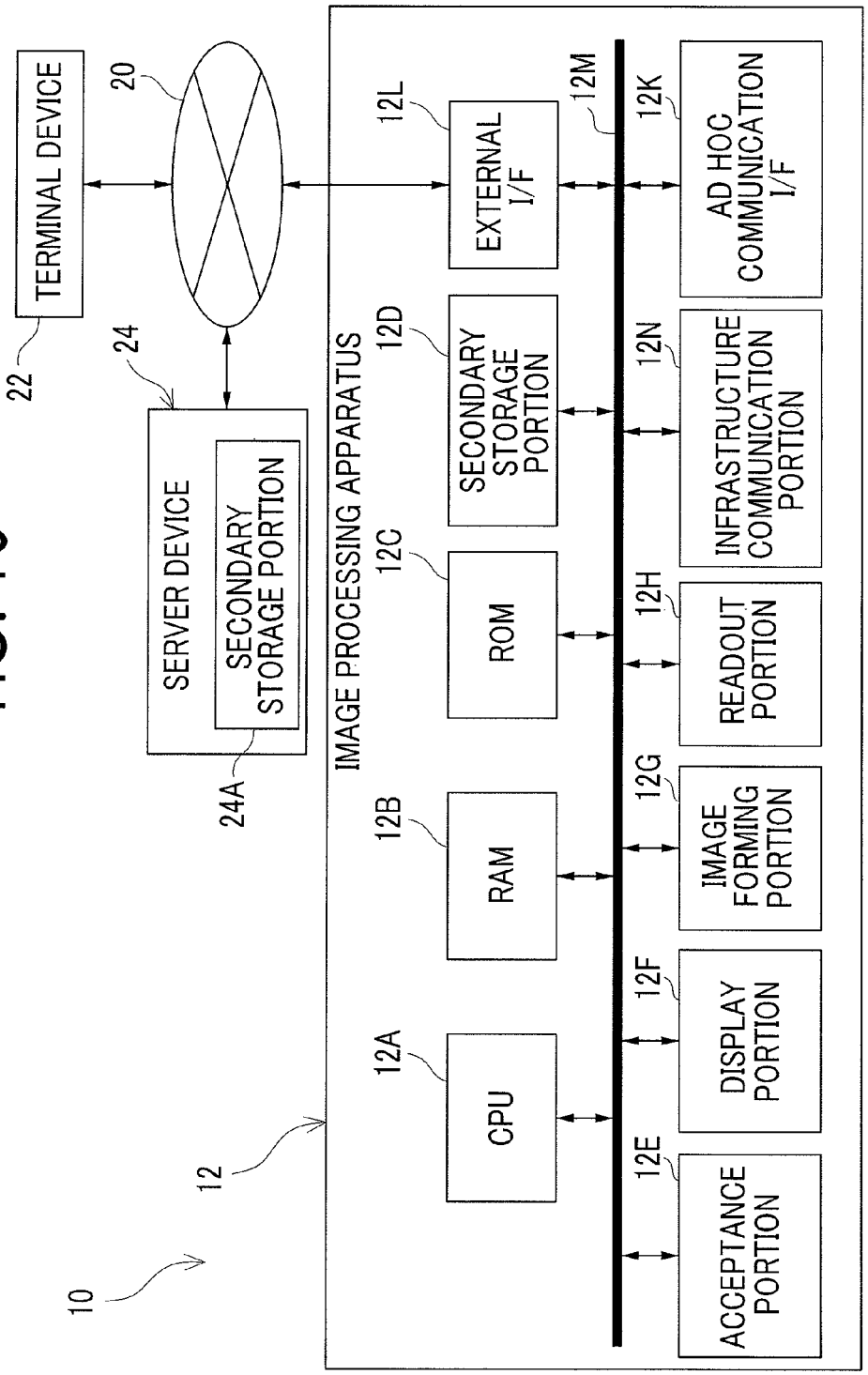

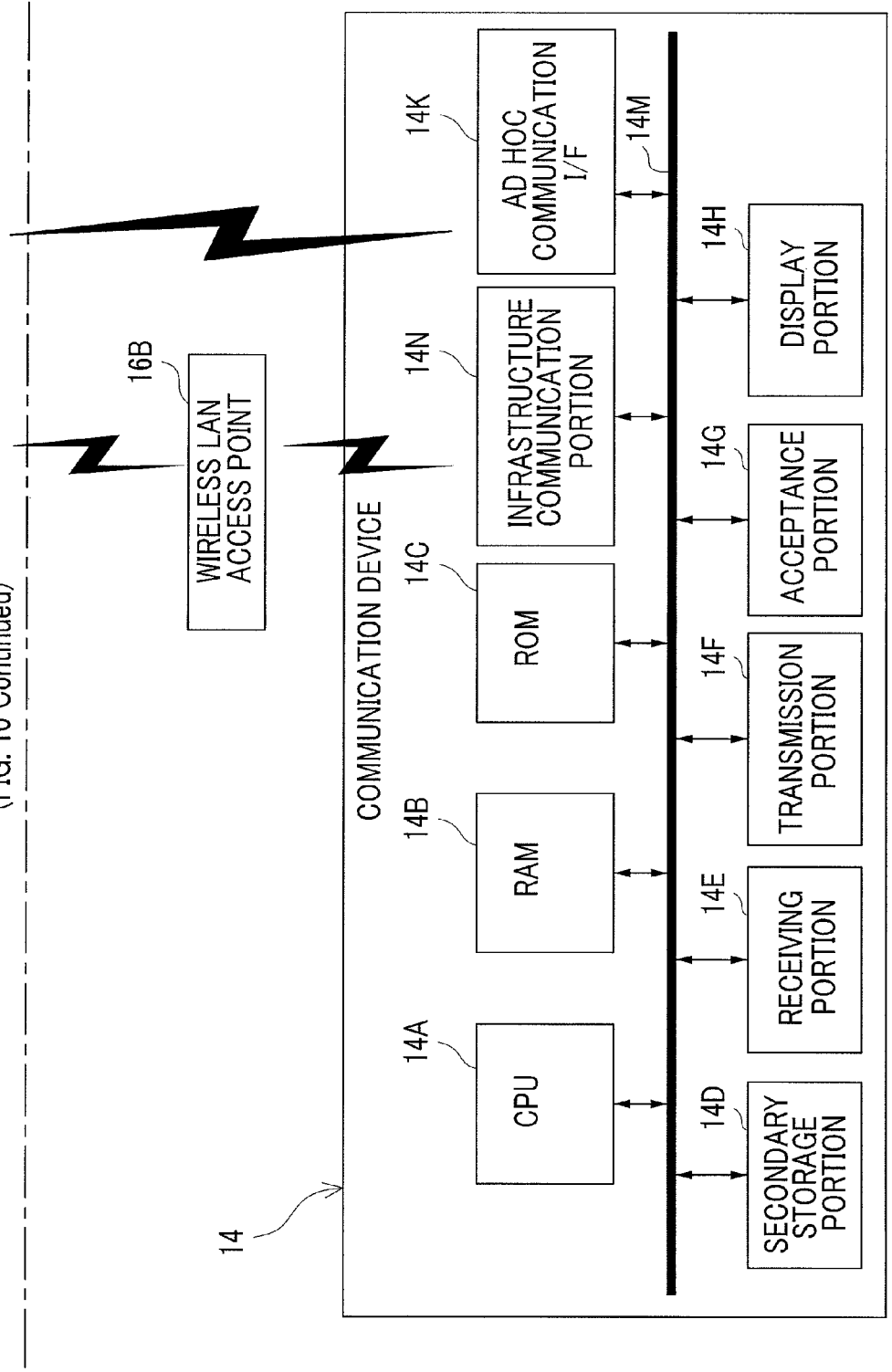
(FIG. 10 Continued)

IMAGE PROCESSING APPARATUS, IMAGE PROCESSING SYSTEM, COMMUNICATION DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-199864 filed Sep. 13, 2011.

BACKGROUND

Technical Field

The present invention relates to an image processing apparatus, an image processing system, a communication device, and a non-transitory computer readable medium.

SUMMARY

According to an aspect to the invention, there is provided an image processing apparatus including: a readout unit that reads out an image; a grant unit that grants a right to receive image information provided to a communication destination through a wireless communication, in response to a request from the communication destination, the image information representing the image read out by the readout unit; and a providing unit that provides the image information by transmitting the image information to the communication destination through the wireless communication, when the communication destination exercises the right granted by the grant unit in a state where a wireless communication connection to the communication destination is established.

BRIEF DESCRIPTION OF THE DRAWINGS

Exemplary embodiments of the present invention will be described in detail based on the following figures, wherein:

FIG. 4 is a flow diagram illustrating an example of a flow of a process of a right granting process program according to the exemplary embodiment;

FIG. 6 is a flow diagram illustrating an example of a flow of a process of an image providing program according to the exemplary embodiment;

FIG. 10 is a configuration diagram illustrating a modified example of the configuration of the image processing system according to the exemplary embodiment.

DETAILED DESCRIPTION

Hereinafter, an example of an exemplary embodiment for carrying out the invention will be described in detail with reference to the drawings.

Figure 1:
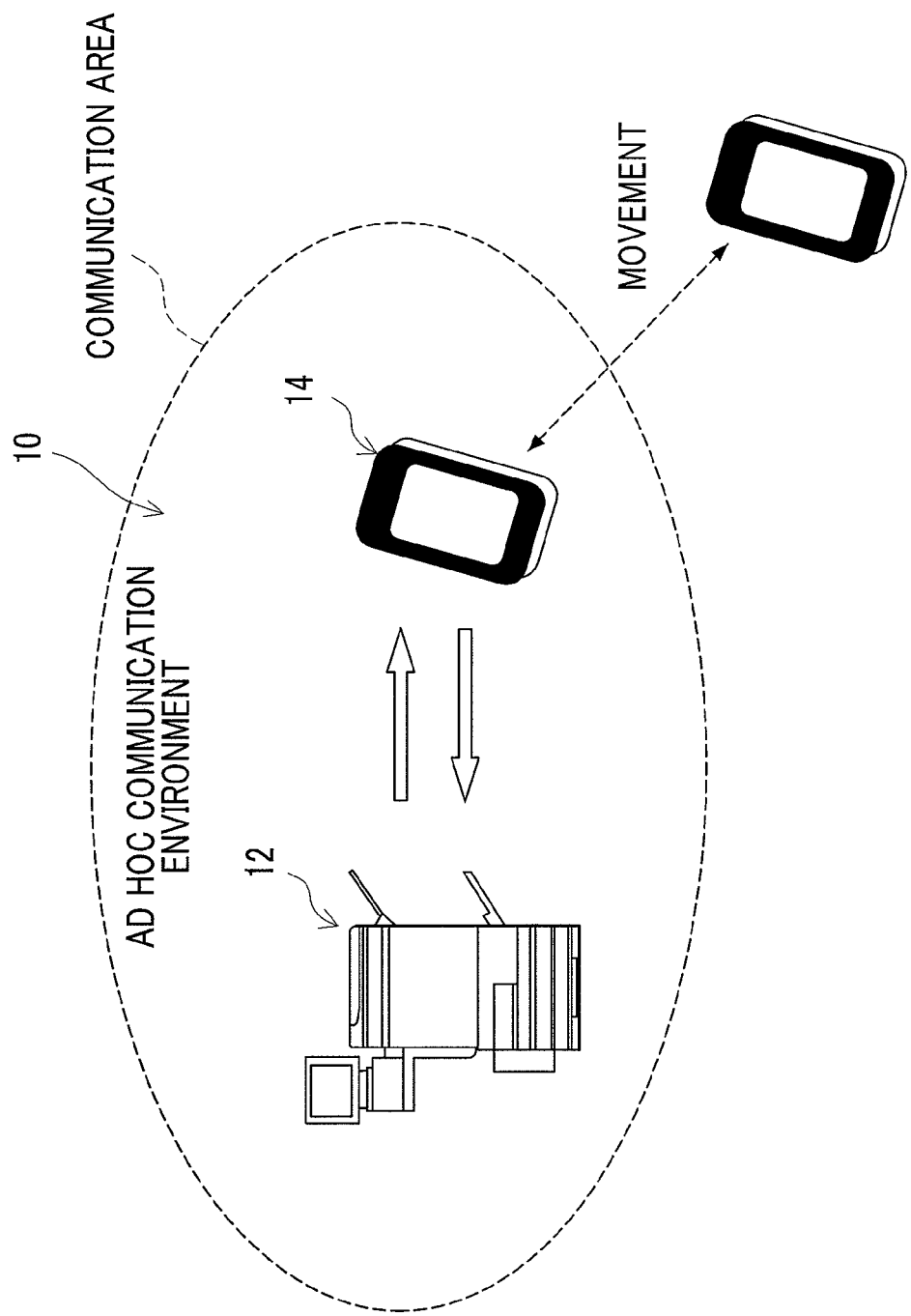
FIG. 1 is a schematic diagram illustrating an example of a schematic configuration of an image processing system according to an exemplary embodiment.

FIG. 1 schematically shows an image processing system 10 which is an example of an image processing system according to the exemplary embodiment. As shown in FIG. 1, the image processing system 10 includes an image processing apparatus and a communication device 14. The image processing apparatus 10 has an image readout function of optically reading out an image to generate image information, and an image forming function of forming an image on a recording medium (paper as an example) on the basis of image information obtained by optically reading out the image through the image readout function or image information acquired from the outside. On the other hand, the communication device 14 has a function of a so-called common cellular phone, and a touch panel display. In addition, the image processing apparatus 12 and the communication device 14 all have a communication function for giving and receiving information to and from each other. The image processing apparatus 12 and the communication device 14 bring the communication function into action mutually, to thereby perform the giving and receiving of information to and from each other through the wireless communication using ad hoc mode (hereinafter, referred to as "ad hoc communication") and Internet communication using the Internet line. Meanwhile, in the image processing system 10 according to the exemplary embodiment, the communication area related to ad hoc communication performed by the image processing apparatus 12 and the communication device 14 is limited to an area within the dashed-line ellipse shown in FIG. 1 as an example. Therefore, when at least one of the image processing apparatus 12 and the communication device 14 are out of the communication area, ad hoc communication is not performed between the image processing apparatus 12 and the communication device 14. In the example shown in FIG. 1, the configuration is also shown in which ad hoc communication is not performed between the image processing apparatus 12 and the communication device 14 as the communication device 14 moves out of the communication area.

Figure 2:
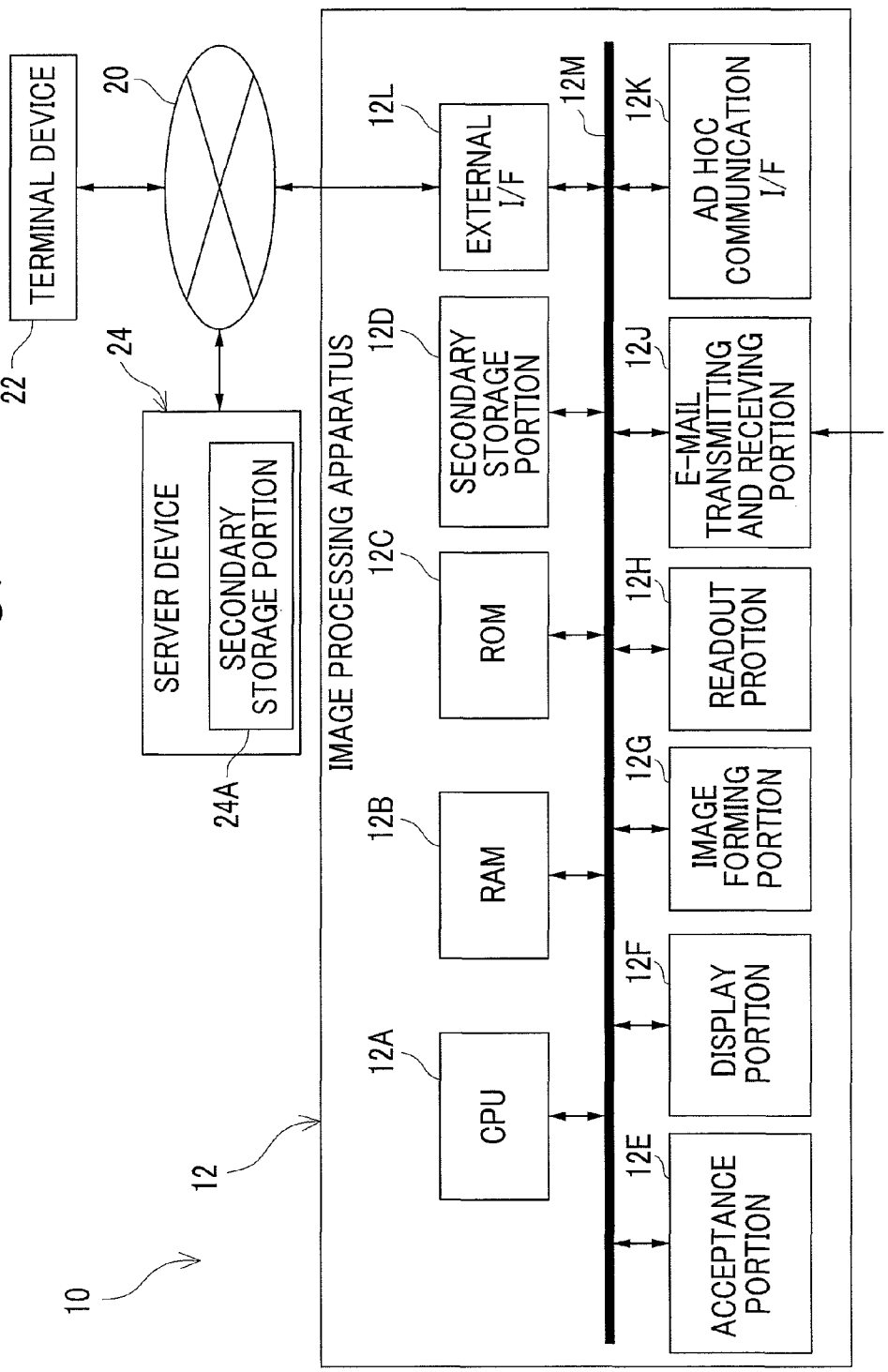
FIG. 2 is a configuration diagram illustrating an example of the configuration of the image processing system according to the exemplary embodiment.

FIG. 2 is a configuration diagram illustrating an example of the configuration of the image processing system 10 according to the exemplary embodiment. As shown in FIG. 2, the image processing apparatus 12 included in the image processing system 10 includes a CPU (Central Processing Unit) 12A that controls the operation of the entire image processing apparatus 12, a RAM (Random Access Memory) 12B used as a work area or the like when executing various types of processing programs by the CPU 12A, a ROM (Read Only Memory) 12C in which various types of processing programs or various types of parameters and the like are previously stored, and a secondary storage portion (herein, a hard disk as an example) 12D used for storing various types of information.

In addition, the image processing apparatus 12 includes a user interface including a touch panel display. This user interface includes an acceptance portion 12E and a display portion 12F. The acceptance portion 12E has cross-keys, various types of setting keys, a power button, and the like, in addition to the touch panel included in the touch panel display, and accepts various types of information. The display portion 12F has a display included in the touch panel display, and displays various types of information.

In addition, the image processing apparatus 12 includes an image forming portion 12G that forms an image representing based on image information on a recording medium, and a readout unit 12H that acquires image information by scanning a document using an image sensor. Meanwhile, in the exemplary embodiment, a xerographic printer is applied as the image forming portion 12G, but an ink jet printer, a thermal printer, a dot impact printer and the like may be applied without being limited thereto. In addition, in the exemplary embodiment, a CCD (Charge Coupled Device) optical reduction type image scanner which is a flat head type scanner equipped with an automatic document feeder (so-called ADF) may be applied as the readout unit 12H, but a handy-type or drum-type image scanner may be applied without being limited thereto. An image scanner including other image pickup devices such as a CIS (Contact Image Sensor) contact sensor type image scanner may be applied without being limited to the CCD (Charge Coupled Devices) optical reduction type image scanner.

In addition, the image processing apparatus 12 includes an e-mail transmitting and receiving portion 12J, connected to the communication device 14 through an Internet line 16, which transmits and receives information to and from the communication device 14 by way of a server device 18 on the Internet line 16 through an e-mail, an ad hoc communication interface (I/F) 12K that gives and receives various types of information to and from the communication device 14 through ad hoc communication, and an external I/F 12L, connected to a terminal device 22 through a communication line (LAN (Local Area Network) as an example) 20, which gives and receives various types of information to and from the terminal device 22. Meanwhile, a server device 24 is connected to the communication line 20, and the server device 24 gives and receives various types of information to and from the image processing apparatus 12 through the communication line 20. In addition, the server device 24 includes a secondary storage portion (hard disk as an example) 24A, receives specific information (image information by read out with the readout unit 12H, as an example) transmitted from the image processing apparatus 12, stores the received information in a specific storage region of the secondary storage portion 24A, and notifies the image processing apparatus 12 of an address of a storage destination.

The CPU 12A, the RAM 12B, the ROM 12C, the secondary storage portion 12D, the acceptance portion 12E, the display portion 12F, the image forming portion 12G, the readout portion 12H, the e-mail transmitting and receiving portion 12J, ad hoc communication I/F 12K, and the external I/F 12L are electrically connected to each other by a bus 12M including an address bus, a control bus, a system bus and the like. Therefore, the CPU 12A performs access to the RAM 12B, the ROM 12C and the secondary storage portion 12D, acquisition of information accepted in the acceptance portion 12E, a display of various types of information on the display portion 12F, acquisition of various types of information from the image forming portion 12G, control of the operation of the image forming portion 12G, acquisition of various types of information from the readout portion 12G, control of the operation of the readout portion 12G, transmission and reception of various types of information to and from the communication device 12 through the e-mail transmitting and receiving portion 12J, transmission and reception of various types of information to and from the communication device 12 through ad hoc communication I/F 12K, and transmission and reception of various types of information to and from the terminal device 22 through the external I/F 12L, respectively.

Figure 3:
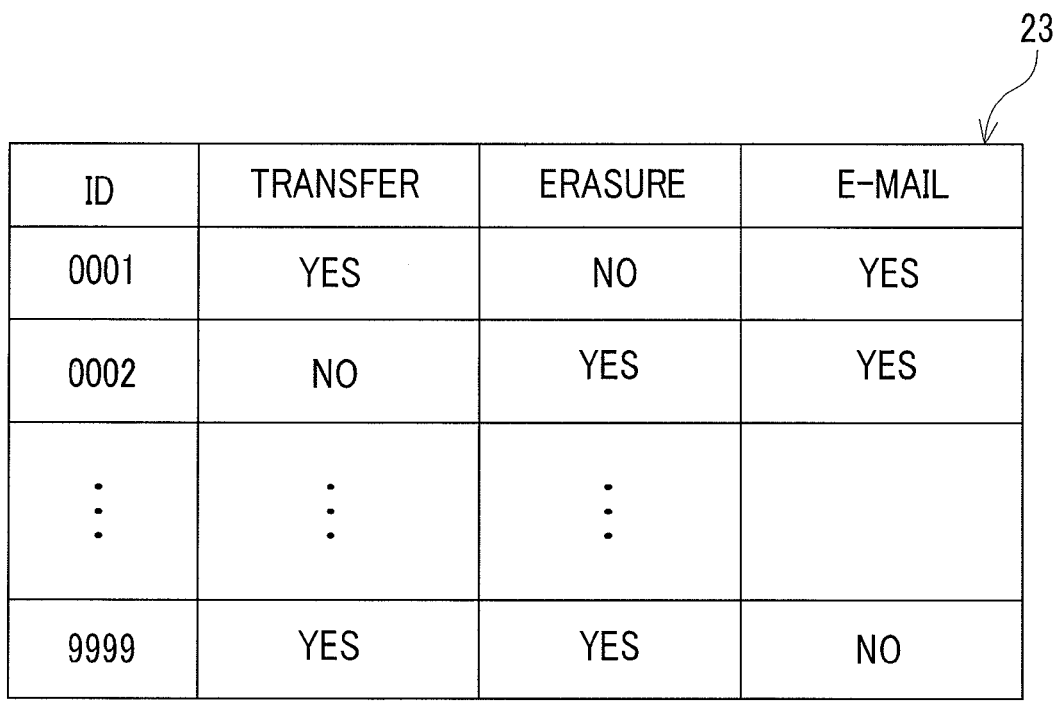
FIG. 3 is a schematic diagram illustrating an example of a configuration of a database included in the image processing apparatus according to the exemplary embodiment.

In the meantime, the image processing apparatus 12 according to the exemplary embodiment is configured to transmit the image information obtained by reading out the image in the readout portion 12H of the image processing apparatus 12 to the communication device 14 through ad hoc communication. In addition, in the image processing apparatus 12 according to the exemplary embodiment, a right granting process described later is executed in order to accomplish the transmission of the image information to the communication device 14 without interrupting the transmission. In order to realize this right granting process, a database 23 is constructed in the secondary storage portion 21D of the image processing apparatus 12 according to the exemplary embodiment as shown in FIG. 3 as an example. The database 23 is constructed beforehand on the basis of specific information accepted in the acceptance portion 12E, and is configured to be rewritable through the acceptance portion 12E. The database 23 is configured such that transfer information indicating whether or not to transfer the image information to the server device 24 when the communication connection related to ad hoc communication is not established even after the lapse of a predetermined period of time, erasure information indicating whether or not to erase the image information without re-executing the communication connection related to ad hoc communication when the communication connection related to ad hoc communication is not established even after the lapse of a predetermined period of time, and e-mail information indicating whether or not to transmit an address specifying the location of the image information through the e-mail when the communication connection related to ad hoc communication is not established are associated with each ID (for example, login information previously granted for each user) specifying a user of the image processing apparatus 12 or the communication device 14. In the exemplary embodiment, the IDs are accepted in the acceptance portion 12E, and the database 23 is constructed by associating the transfer information, the erasure information, and the e-mail information, which are accepted in the acceptance portion 12E, with each accepted ID. Meanwhile, in the example shown in FIG. 3, the transfer information indicating that the image information is transferred to the server device 24, the erasure information indicating that the image information is erased without re-executing the communication connection, and the e-mail information indicating that the address is transmitted through the e-mail are associated with the ID of "0001", the transfer information indicating that the image information is not transferred to the server device 24, the erasure information indicating that the image information is erased without re-executing the communication connection, and the e-mail information indicating that the address is transmitted through the e-mail are associated with the ID of "0002", and the transfer information indicating that the image information is transferred to the server device 24, the erasure information indicating that the image information is erased without re-executing the communication connection, and the e-mail information indicating that the address is not transmitted through the e-mail are associated with the ID of "9999".

On the other hand, the communication device 14 includes a CPU 14A that controls the operation of the entire communication device 14, a RAM 14B used as a work area or the like at the time of the execution of various types of processing programs by the CPU 14A, a ROM 14C in which various types of processing programs or various types of parameters and the like are previously stored, a secondary storage portion (herein, a flash memory as an example) 14D used for storing various types of information, a receiving portion 14E that receives communication from a communication partner, a transmission portion 14F that transmits communication to the communication partner, an acceptance portion 14G including a touch panel included in a touch panel display or various types of keys used for inputting (accepting) various types of information, a display portion 14H, having a display included in the touch panel display, which displays various types of information, an e-mail transmitting and receiving portion 14J that transmits and receives information to and from the image processing apparatus 12 by way of the server device 18 on the Internet line 16 through the e-mail, and an ad hoc communication I/F 14K that gives and receives various types of information to and from the image processing apparatus 12 through ad hoc communication.

The CPU 14A, the RAM 14B, the ROM 14C, the secondary storage portion 14D, the receiving portion 14E, the transmission portion 14F, the acceptance portion 14G, the display portion 14H, the e-mail transmitting and receiving portion 14J, and the ad hoc communication I/F 14K are electrically connected to each other by a bus 14M including an address bus, a control bus, a system bus and the like. Therefore, the CPU 14A performs access to the RAM 14B, the ROM 14C and the secondary storage portion 14D, acquisition of information from the receiving portion 14E, control of the operation of the receiving portion 14E, acquisition of information from the transmission portion 14F, control of the operation of the transmission portion 14F, acquisition of information accepted in the acceptance portion 12G, a display of various types of information on the display portion 14H, transmission and reception of various types of information to and from the image processing apparatus 12 through the e-mail transmitting and receiving portion 14J, and transmission and reception of various types of information to and from the image processing apparatus 12 through the ad hoc communication I/F 14K, respectively.

In the meantime, as shown in FIG. 1, when the communication device 14 is out of the communication area (moves out of the communication range) or when a function, included in the communication device 14, which is not used without cutting off the communication connection related to ad hoc communication is used, the communication connection related to ad hoc communication between the image processing apparatus and the communication device 14 is cut off, and the transmission through ad hoc communication is not performed. For this reason, a situation occurs that the transmission of the image information, obtained by reading out the image in the readout portion 12H of the image processing apparatus 12, to the communication device 14 through ad hoc communication is interrupted (communication is cut off). Consequently, in the image processing system 10 according to the exemplary embodiment, in order to accomplish the transmission of the image information, obtained by reading out the image in the readout portion 12H of the image processing apparatus 12, to the communication device 14 through ad hoc communication by a single communication connection, a right granting process, a communication status monitoring process, and an image providing process are executed by the image processing apparatus 12, and a notification display process and a right exercise process are executed by the communication device 14. In the image processing apparatus 12, in order to realize the right granting process, the communication status monitoring process, and the image providing process, various types of processes included in each of the right granting process, the communication status monitoring process, and the image providing process are realized by the software configuration. In the communication device 14, various types of processes included in the notification display process and the right exercise process are realized by the software configuration. An example thereof includes a configuration in which a program is executed using a computer. However, it goes without saying that the configuration may be realized by the hardware configuration or the combination of the hardware configuration and the software configuration, without being limited to the realization by such a software configuration.

Hereinafter, description will be made of a case in which the CPU 12A of the image processing apparatus 12 according to the exemplary embodiment realizes the right granting process by executing a right granting process program, a case in which the CPU 12A realizes the communication status monitoring process by executing a communication status monitoring process program, a case in which the CPU 12A realizes the image providing process by executing an image providing program, a case in which the CPU 14A of the communication device 14 according to the exemplary embodiment realizes the notification display process by executing a notification display process program, and a case in which the CPU 14A realizes the right exercise process by executing a right exercise program. In this case, the following configurations may be applied, such as a configuration in which the right granting process program, the communication status monitoring process program, and the image providing program are previously stored in the ROM 12C, and the notification display process program and the right exercise program are previously stored in the ROM 14C, a configuration in which the memory content is provided in a state where it is stored on a recording medium which is read out by a computer, and a configuration in which delivery processing is performed through a communication unit in a wired or wireless manner.

FIG. 4 is a flow diagram illustrating an example of a flow of a process of the right granting process program executed by the CPU 12A when readout transmission instructions for transmitting image information obtained by reading out an image to the communication device 14 through ad hoc communication is accepted by the acceptance portion 12E. Meanwhile, herein, in order to avoid complication, description will be made of a case in which the database 23 shown in FIG. 3 is previously constructed. In addition, herein, in order to avoid complication, description will be made of a case in which polling for establishing the communication connection related to ad hoc communication is started when the readout transmission instructions are accepted in the acceptance portion 12E. In addition, herein, in order to avoid complication, description will be made of a case in which an ID previously granted to a user is already accepted by the acceptance portion 12E. In addition, herein, in order to avoid complication, description will be made of a case in which the image processing apparatus 12 has already acquired an e-mail address related to the communication device 14 with which communication is performed.

In step 100 of FIG. 4, readout of the image by the readout portion 12H is started. In the next step 102, standby is performed until the readout of the image by the readout portion 12H is completed, and then the process proceeds to step 104. Image information obtained by reading out the image in the processes of steps 100 and 102 mentioned above is stored in a predetermined storage region α of the secondary storage portion 12D, and then the processes proceed to step 106. In step 106, it is determined whether or not the communication connection related to ad hoc communication is established, and the process proceeds to step 108 when the determination is positive. The grant of the right to receive the image information through ad hoc communication to the communication device 14 (hereinafter, simply referred to as the "right") is started by transmitting right information, indicating the right to receive the image information through ad hoc communication, to the communication device 14, and then the process proceeds to step 110. Meanwhile, address information indicating an address of the storage region α is contained in the right information transmitted to the communication device 14 by the processes of steps 108 to 112 mentioned above. In addition, when the process of step 128 is executed, transfer destination address information described later is contained in the right information.

In step 110, it is determined whether or not the communication connection related to ad hoc communication is cut off. When the determination is positive, polling for establishing the communication connection related to ad hoc communication is resumed and the process returns to step 106, whereas the process proceeds to step 112 when the determination is negative. In step 112, it is determined whether or not the grant of the right to the communication device 14 is completed (the transmission of the right information to the communication device 14 is accomplished), and the process returns to step 110 when the determination is negative, whereas the right granting process program is terminated when the determination is positive.

On the other hand, the process proceeds to step 114 when the determination is negative in step 106, and polling for establishing the communication connection related to ad hoc communication is started and then it is determined whether or not a predetermined time (for example, 30 seconds) lapses. The process returns to step 106 when the determination is negative, whereas the process proceeds to step 116 when the determination is positive. In step 116, transfer information corresponding to an ID accepted by the acceptance portion 12E at this time is acquired from the database 23, and it is determined whether or not the acquire transfer information indicates that the image information is transferred to the server device 24. The process proceeds to step 118 when the determination is positive, and after the image information stored in the storage region α is transferred to a specific transfer destination, the process proceeds to step 120. In the exemplary embodiment, as the above-mentioned "specific transfer destination", the secondary storage portion 14A of the server device 24 is applied. In the above-mentioned step 118, when the image information is transferred to the server device 24, the server device 24, accordingly, transmits transfer destination address information indicating an address of the transfer destination (address for specifying the storage destination of the image information in the secondary storage portion 14A) to the image processing apparatus 12. The image processing apparatus 12 receives the transfer destination address information transmitted from the server device 24.

In step 120, it is determined whether or not a communication unit that transmits the image information to the communication device 14 exists in other than ad hoc communication, and the process proceeds to step 122 when the determination is positive. In the exemplary embodiment, the communication unit that transmits the image information to the communication device 14 in other than ad hoc communication includes a communication unit using an e-mail. Consequently, in step 122, after the right is granted to the communication device 14 by transmitting the right information to the communication device 14 through the e-mail, the right granting process program is terminated. Meanwhile, the transfer destination address information is contained in the right information transmitted to the communication device 14 by the process of step 122 mentioned above.

On the other hand, the process proceeds to step 124 when the determination is negative in step 116. Erasure information corresponding to an ID accepted by the acceptance portion 12E at this time is acquired from the database 23, and it is determined whether or not the acquired erasure information indicates that the image information is erased without re-executing the communication connection. The process proceeds to step 126 when the determination is positive, whereas the process proceeds to step 128 when the determination is negative. In step 126, after the image information is erased from the storage region α, the right granting process program is terminated.

In step 128, it is determined whether or not the communication connection related to ad hoc communication is established, and the process proceeds to step 108 when the determination is positive, whereas the process proceeds to step 130 when the determination is negative. The execution of the process of step 120 or 124 mentioned above is terminated and then it is determined whether or not a predetermined time (for example 30 seconds) lapses. The process returns to step 128 when the determination is negative, whereas the process proceeds to step 132 when the determination is positive. In step 132, after the image information is erased from the storage region α, the right granting process program is terminated.

Figure 5:
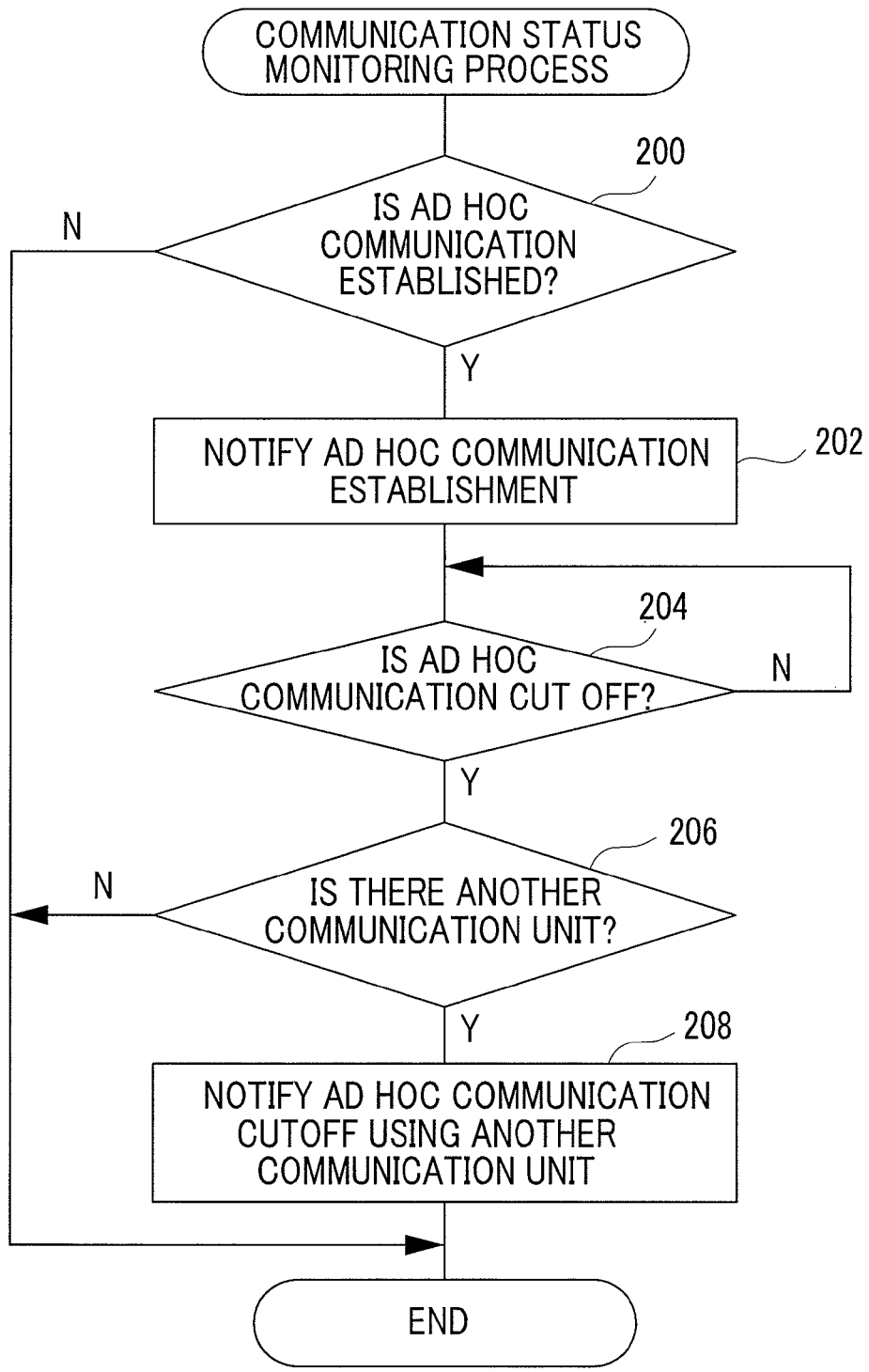
FIG. 5 is a flow diagram illustrating an example of a flow of a process of a communication status monitoring process program according to the exemplary embodiment.

FIG. 5 is a flow diagram illustrating an example of a flow of a process of a communication status monitoring process program executed by the CPU 12A in parallel with the above-mentioned right granting process program, when the readout transmission instructions for transmitting the image information obtained by reading out the image to the communication device 14 through ad hoc communication is accepted by the acceptance portion 12E.

In step 200 of FIG. 5, it is determined whether or not the communication connection related to ad hoc communication is established, and the process proceeds to step 202 when the determination is positive. In step 202, after ad hoc communication establishment notification information indicating that the communication connection related to ad hoc communication is established is transmitted to the communication device 14 through ad hoc communication, the process proceeds to step 204.

In step 204, standby is performed until the communication connection related to ad hoc communication is cut off, and then the process proceeds to step 206. It is determined whether or not a communication unit that notifies the communication device 14 that the communication connection is cut off exists in other than ad hoc communication, and the process proceeds to step 208 when the determination is positive. In the exemplary embodiment, the communication unit, existing in other than ad hoc communication, which notifies the communication device 14 that the communication connection is cut off includes a communication unit using the e-mail. Consequently, in step 208, after the communication device 14 is notified that the communication connection related to ad hoc communication is cut off by transmitting ad hoc communication cutoff notification information, indicating that the communication connection related to ad hoc communication is cut off, to the communication device 14 through the e-mail, the communication status monitoring process program is terminated. On the other hand, when the determination is negative in step 200 mentioned above and when the determination is negative in step 206 mentioned above, the communication status monitoring process program is terminated.

FIG. 6 is a flow diagram illustrating an example of a flow of a process of an image providing program executed by the CPU 12A, when the right is granted to the communication device 14 by the above-mentioned right granting process.

In step 300 of FIG. 6, reception standby of right information (right exercise standby) transmitted by executing a process of step 506 of a right exercise program described later by the communication device 14 is performed, and then the process proceeds to step 302, and image information is acquired from the storage region (for example, the storage region α or the storage destination of the image information in the secondary storage portion 14A) of the address indicated by the address information contained in the right information received in the process of step 300 mentioned above or the transfer destination address. In the next step 304, standby is performed until the communication connection related to ad hoc communication is established, and then the process proceeds to step 306. Control over the ad hoc communication I/F 12K is started so as to transmit the image information acquired in the process of step 302 mentioned above to the communication device 14, and then the process proceeds to step 308.

In step 308, it is determined whether or not the communication connection related to ad hoc communication is cut off, and the process proceeds to step 310 when the determination is positive. After the transmission control of the image information is stopped, the image providing program is terminated. Meanwhile, when the communication is interrupted during the transmission of the image information in ad hoc communication (when the determination is positive in step 308), the image information is transferred to the server device 24 and the communication device 14 is notified of a new place (for example, an address in the secondary storage portion 24A of the server device 24) through the e-mail, and thus a request to transmit the image information may be accepted by a communication unit other than ad hoc communication. Thereby, even if the image information is not transmitted and received by ad hoc communication, the image information is transmitted to the communication device 14 by the image processing apparatus 12 using another communication unit (here, the e-mail as an example), and the transmitted image information is received by the communication device 14.

The process proceeds to step 312 when the determination is negative in step 308. It is determined whether or not the entire image information is transmitted which is stored in the storage region (for example, the storage region α or the storage destination of the image information in the secondary storage portion 14A) of the address indicated by the address information contained in the right information received in the process of step 300 mentioned above or the transfer destination address, and the process returns to step 308 when the determination is negative, whereas the process proceeds to step 314 when the determination is positive. In step 314, after the transmission control of the image information is terminated, the process proceeds to step 316. After the image information is erased from the storage region (for example, the storage region α or the storage destination of the image information in the secondary storage portion 14A) of the address indicated by the address information contained in the right information received in the process of step 300 mentioned above or the transfer destination address, the image processing program is terminated.

Figure 7:
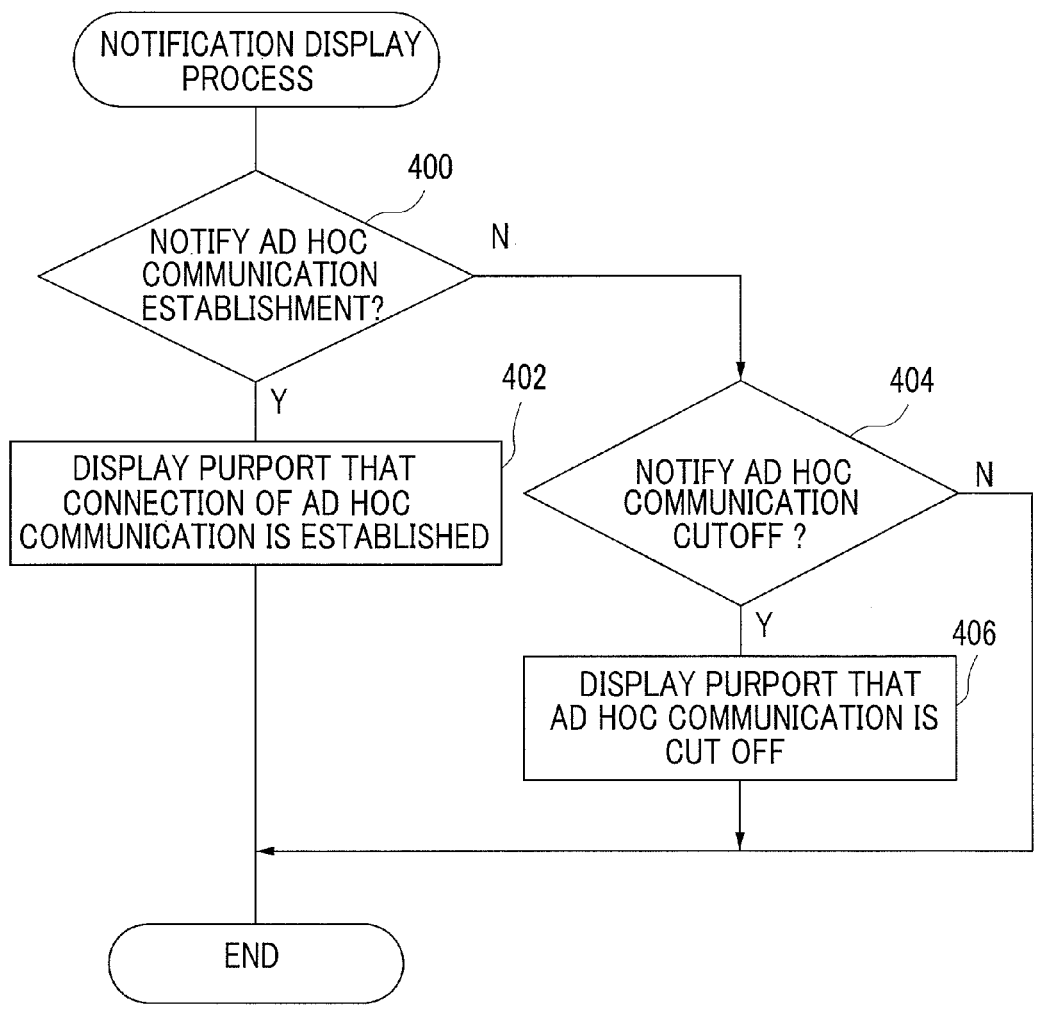
FIG. 7 is a flow diagram illustrating an example of a flow of a process of a notification display process program according to the exemplary embodiment.

FIG. 7 is a flow diagram illustrating an example of a flow of a process of a notification display process program executed by the CPU 14A at predetermined time (for example 3 seconds) intervals, when instructions for starting execution of a notification display process is accepted by the acceptance portion 14G.

In step 400 of FIG. 7, it is determined whether or not the ad hoc communication establishment notification information transmitted by executing the process of step 202 of the above-mentioned communication status monitoring process program is received, and the process proceeds to step 402 when the determination is positive. After information corresponding to the above-mentioned ad hoc communication establishment notification information is displayed on the display portion 14H, the notification display process program is terminated. Meanwhile, in the exemplary embodiment, as the information corresponding to the ad hoc communication establishment notification information, a message of "the connection with ad hoc communication is established" is applied, but without being limited thereto, the information may be an audible display using a voice with which this message is read out or a permanent visual display for printing the above-mentioned message on a recording medium using an image forming function, and may be a display of a combination thereof.

On the other hand, the process proceeds to step 404 when the determination is negative in step 400. It is determined whether or not the ad hoc communication cutoff notification information transmitted by executing the process of step 208 of the above-mentioned communication status monitoring process program is received, and the notification display process program is terminated when the determination is negative, whereas the process proceeds to step 406 when the determination is positive. After information corresponding to the above-mentioned ad hoc communication cutoff notification information is displayed on the display portion 14H, the notification display process program is terminated. Meanwhile, in the exemplary embodiment, as the information corresponding to the ad hoc communication cutoff notification information, a message of "the connection with ad hoc communication is cut off" is applied, but without being limited thereto, the information may be an audible display using a voice with which this message is read out or a permanent visual display for printing the above-mentioned message on a recording medium using an image forming function, and may be a display of a combination thereof.

In this manner, since the state of the communication connection related to ad hoc communication is grasped through the display portion 14H of the communication device 14, the image information is provided to a user at a convenient time.

Figure 8:
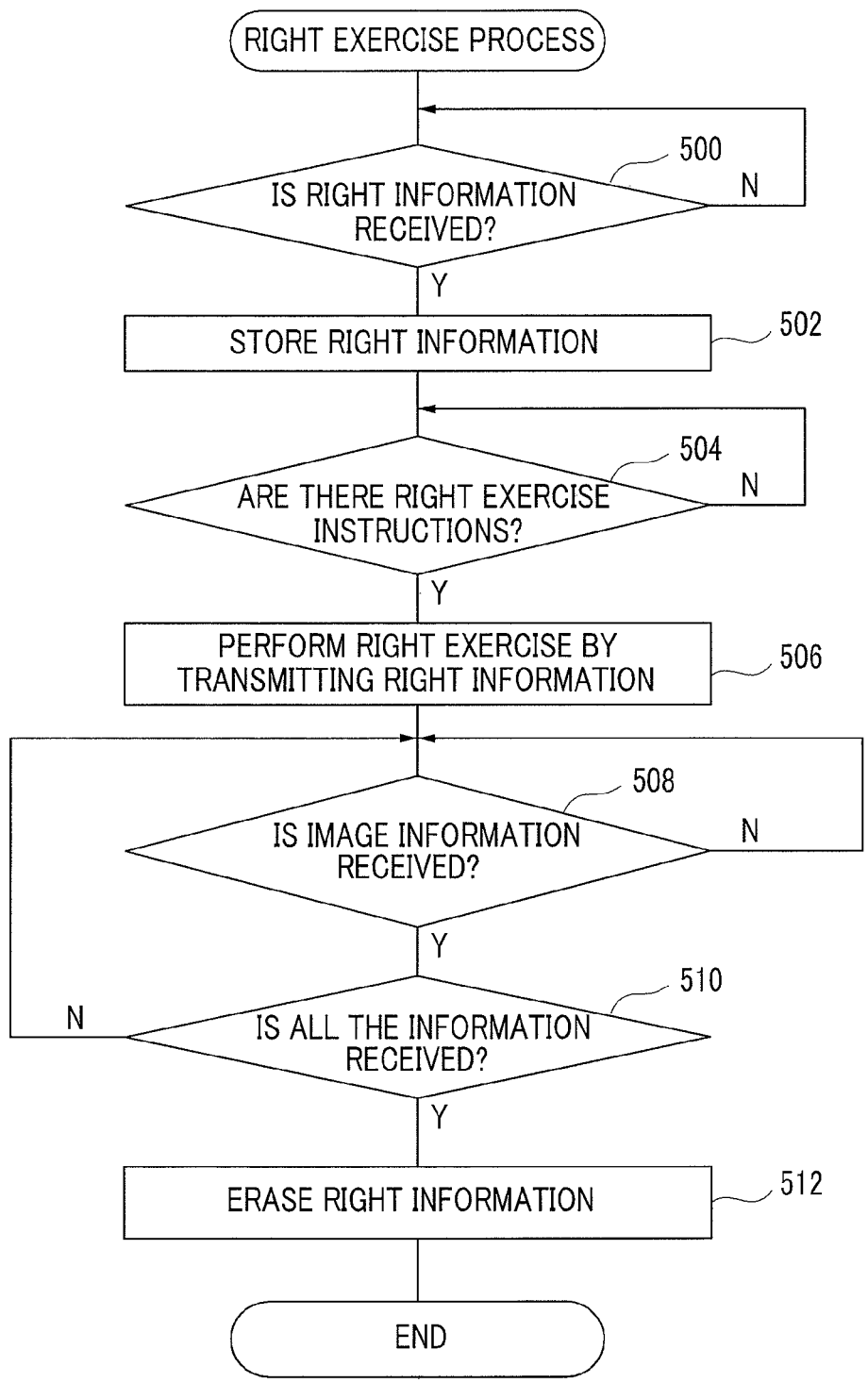
FIG. 8 is a flow diagram illustrating an example of a flow of a process of a right exercise program according to the exemplary embodiment.

FIG. 8 is a flow diagram illustrating an example of a flow of a process of a right exercise program executed by the CPU 14A when instructions for starting execution of a right exercise process are accepted by the acceptance portion 14G. Meanwhile, herein, in order to avoid complication, description will be made of a case in which the communication connection related to ad hoc communication is established.

In step 500 of FIG. 8, reception standby of the right information transmitted by executing the processes of steps 108 to 112 of the above-mentioned right granting process program is performed, and then the process proceeds to step 502. The right information received in the process of step 500 mentioned above is stored in a predetermined storage region β of the secondary storage portion 14D, and then the process proceeds to step 504.

In step 504, standby is performed until instructions for exercising the right indicating the right information stored in the storage region β are accepted by the acceptance portion 14G, and then the process proceeds to step 506. The right information is acquired from the storage region β, and the right is exercised by transmitting the acquired right information to the image processing apparatus 12. In response to this, in the image processing apparatus 12, the process of step 300 of the image providing program mentioned above is determined to be positive.

In the next step 508, reception standby of the image information transmitted by executing the process of step 306 of the image providing program mentioned above is performed, the process proceeds to step 510. It is determined whether or not all the image information stored in the storage region α is received, and the process returns to step 508 when the determination is negative, whereas the process proceeds to step 512 when the determination is positive. In step 512, the right information is erased from the storage region β, and then the right exercise program is terminated.

In this manner, the right is granted to the communication device 14 beforehand, so that when the communication device 14 enters the communication area again even though it moves out of the communication range, the right previously granted is exercised by a user (holder of the communication device 14) at the convenient timing (timing when it is determined that a stay is made within the communication area until the transmission of the image information is accomplished). Thereby, the image information is provided to the communication device 14 by the image processing apparatus 12 without interrupting the ad hoc communication. That is, since a person to receive the image information from the image processing apparatus 12 through the communication device 14 receives the image information from the image processing apparatus 12 at the convenient timing, the wireless transmission (transmission through ad hoc communication) of the image information is accomplished without interruption thereof.

Figure 9:
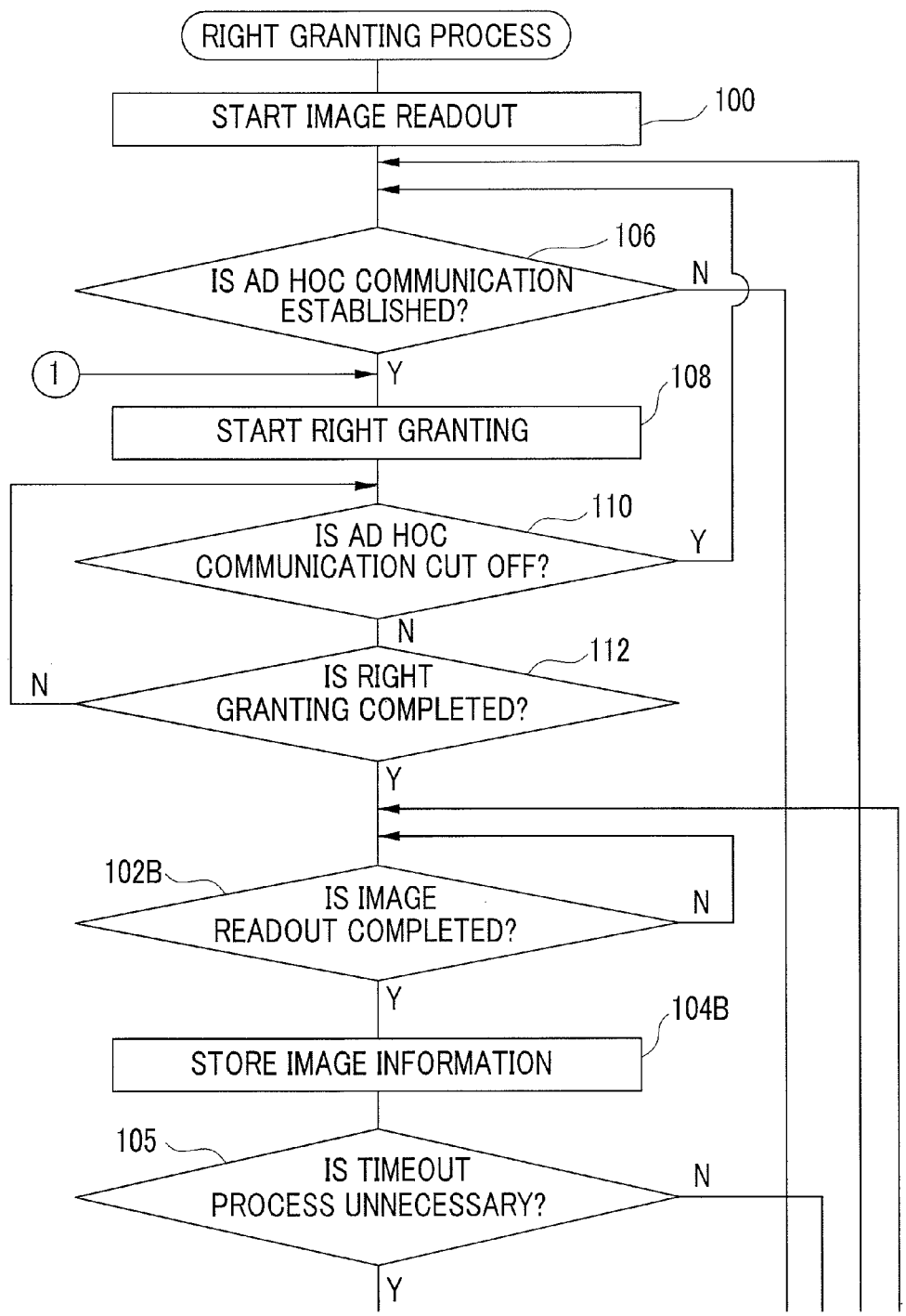
FIG. 9 is a flow diagram illustrating a modified example of the flow of the process of the right granting process program according to the exemplary embodiment.

Meanwhile, in the above-mentioned exemplary embodiment, the configuration example is described in which the image readout is completed and then the real processes related to the right grant (processes after step 106 of the flow diagram shown in FIG. 4) are started, but without being limited thereto, the real processes related to the right grant may be started while the image readout is performed. An example of a specific process in this case is shown in FIG. 9. FIG. 9 is a flow diagram illustrating a modified example of a flow of a process of a right granting process program shown in FIG. 4. The flow diagram shown in FIG. 9 is different in that steps 102 and 104 are omitted, step 114B is applied instead of step 114, and steps 102B, 104B, and 105 are newly provided, as compared to the flow diagram shown in FIG. 4. The process proceeds to step 114B when the determination is negative in step 106 of FIG. 9. In step 114B, polling for establishing the communication connection related to ad hoc communication is started and then it is determined whether or not a predetermined time (for example, 30 seconds) lapses, and the process returns to step 106 when the determination is negative, whereas the process proceeds to step 102B when the determination is positive.

The process proceeds to step 102B when the determination is positive in step 112. After a process equivalent to the process of step 102 mentioned above is executed, the process proceeds to step 104B, and after a process equivalent to the process of step 104 mentioned above is executed, the process proceeds to step 105. In step 105, it is determined whether or not a timeout process is unnecessary. Here, the timeout process is a process in which the execution is necessary when the determination is positive in step 114B mentioned above, and specifically means processes of step 116 to step 132.

While the right granting process program is terminated when the determination is positive in step 105, the flow proceeds to step 116 when the determination is negative. In this manner, the right is granted to the communication device 14 in a period of time when the image is read out, so that when the communication device 14 enters the communication area again even though it moves out of the communication range in a period of time when the image is readout, the right previously granted is exercised. Thereby, the image information is provided to the communication device 14 by the image processing apparatus 12 without interrupting the ad hoc communication.

In addition, in the above-mentioned exemplary embodiment, the configuration example is described in which the right is granted from the image processing apparatus 12 to the communication device 14 through the communication unit using the e-mail when the connection of the ad hoc communication is not established, but without being limited thereto, the right may be granted from the image processing apparatus 12 to the communication device 14 using the communication unit which performs communication through infrastructure mode when the connection of the ad hoc communication is not established. In this case, for example, as shown in FIG. 10, an infrastructure communication portion 12N may be applied instead of the e-mail transmitting and receiving portion 12J of the image processing apparatus 12 shown in FIG. 2, an infrastructure communication unit 14N may be applied instead of the e-mail transmitting and receiving portion 14J of the communication device 14, respectively, and a wireless LAN access point 16B may be applied instead of the Internet line 16. Meanwhile, in example shown in FIG. 10, a configuration is shown in which the image processing apparatus 12 and the communication device 14 equivalent to child devices perform wireless communication through the wireless LAN access point 16B equivalent to parent devices. In this manner, when the communication connection related to ad hoc communication is not established, the right is granted from the image processing apparatus 12 to the communication device 14 using an alternative communication unit, so that the situation where the right is not granted to the communication device 14 is prevented from occurring.

In addition, in the above-mentioned exemplary embodiment, the configuration example is described in which the database 23 is constructed beforehand on the basis of the instructions from a user accepted by the acceptance portion 12E, but without being limited thereto, a database equivalent to the database 23 may be constructed by associating the transfer information, the erasure information, and the e-mail information with each predetermined item in accordance with the design specification of the image processing apparatus 12 before shipment of the image processing apparatus 12. Further, in addition to the transfer information, the erasure information, and the e-mail information determined for each predetermined item on the basis of the design specification of the image processing apparatus 12 before shipment thereof, a database equivalent to the database 23 may be constructed by associating the transfer information, the erasure information, and the e-mail information with each ID on the basis of the instructions from a user accepted by the acceptance portion 12E after shipment of the image processing apparatus 12.

In addition, in the above-mentioned exemplary embodiment, the case is described, as a premise, in which the IDs and the e-mail addresses related to the communication device 14 are acquired in the previous step of executing the right granting process, but without being limited thereto, the image processing apparatus 12 urges the communication device 14 to acquire the IDs from the communication device 14 at the time of the previous step of the image readout, the execution period of the image readout, or the ad hoc communication, whereby the IDs are acquired from the communication device 14 beforehand, and it may be determined whether or not to transmit the image information on the basis of the acquired IDs when the image information is transmitted (for example, step 306 shown in FIG. 6). Thereby, the security is enhanced.

In addition, the image processing apparatus 12 urges the communication device 14 to acquire the e-mail addresses from the communication device 14 at the time of the previous step of the image readout, the execution period of the image readout, or the ad hoc communication. When the acquisition of the e-mail addresses succeeds, the right information may be transmitted to the acquired e-mail addresses through the e-mail. In this case, the security is also enhanced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a readout unit that reads out an image;
    a grant unit that grants a right to receive image information provided to a communication destination through a wireless communication using a second communication unit, in response to a request from the communication destination, the image information representing the image read out by the readout unit; and
    a providing unit that provides the image information by transmitting the image information to the communication destination through the wireless communication, when the communication destination exercises the right granted by the grant unit in a state where a wireless communication connection to the communication destination is established,
    wherein the grant unit grants the right by transmitting the right to the communication destination through the wireless communication when the wireless communication connection to the communication destination is established, and grants the right by transmitting the right to the communication destination using a first communication unit different from the second communication unit used in the wireless communication when the wireless communication connection to the communication destination is not established,
    wherein the second communication unit is a communication unit that performs the wireless communication by ad hoc mode.

2. The image processing apparatus according to claim 1, wherein the grant unit grants the right to the communication destination in response to the request from the communication destination, when a specific condition is satisfied including a connection establishment condition that the wireless communication connection to the communication destination is established.

3. The image processing apparatus according to claim 2, further comprising:
    a transfer unit that transfers the image information to a predetermined transfer destination, when the connection establishment condition is not satisfied for a predetermined period of time as a condition for transferring the image information, in spite of the request from the communication destination, in a case where the grant unit grants the right by transmitting the right to the communication destination through the wireless communication,
    wherein the providing unit acquires the image information from the transfer destination when the communication destination exercises the right granted by the grant unit, and provides the acquired image information by transmitting the image information to the communication destination through the wireless communication.

4. The image processing apparatus according to claim 3, wherein the right includes information that specifies the transfer destination.

5. The image processing apparatus according to claim 2, further comprising:
    an erasing unit that erases the image information, when the connection establishment condition is not satisfied for a predetermined period of time as a condition for erasing the image information, in spite of the request from the communication destination.

6. The image processing apparatus according to claim 3, further comprising:
    an erasing unit that erases the image information, when the connection establishment condition is not satisfied for a predetermined period of time as a condition for erasing the image information, in spite of the request from the communication destination.

7. The image processing apparatus according to claim 4, further comprising:
    an erasing unit that erases the image information, when the connection establishment condition is not satisfied for a predetermined period of time as a condition for erasing the image information, in spite of the request from the communication destination.

8. The image processing apparatus according to claim 5, further comprising:
    a storage unit that previously stores erasure information indicating whether or not to erase the image information,
    wherein the erasing unit erases the image information, when the connection establishment condition is not satisfied for a predetermined period of time as the condition for erasing the image information, in spite of the request from the communication destination, and it is shown that the erasure information stored in the storage unit indicates erasing the image information.

9. The image processing apparatus according to claim 6, further comprising:
    a storage unit that previously stores erasure information indicating whether or not to erase the image information,
    wherein the erasing unit erases the image information, when the connection establishment condition is not satisfied for a predetermined period of time as the condition for erasing the image information, in spite of the request from the communication destination, and it is shown that the erasure information stored in the storage unit indicates erasing the image information.

10. The image processing apparatus according to claim 7, further comprising:
    a storage unit that previously stores erasure information indicating whether or not to erase the image information,
    wherein the erasing unit erases the image information, when the connection establishment condition is not satisfied for a predetermined period of time as the condition for erasing the image information, in spite of the request from the communication destination, and it is shown that the erasure information stored in the storage unit indicates erasing the image information.

11. The image processing apparatus according to claim 1, wherein
the first communication unit is used as a communication unit that performs a communication by infrastructure mode.

12. The image processing apparatus according to claim 1, wherein
the first communication unit is used as a communication unit that performs a communication using an e-mail.

13. The image processing apparatus according to claim 1, further comprising:
a notification execution unit that executes at least one of a notification to the communication destination that the connection is cut off when a connection state of the wireless communication to the communication destination transits from a state where the connection is established to a state where the connection is cut off, and a notification to the communication destination that the connection is established when the connection state transits from a state where the connection is cut off to a state where the connection is established.

14. An image processing system comprising:
the image processing apparatus according to claim 1; and
a communication device that requests the right from the image processing apparatus, as the communication destination, and receives the image information transmitted from the providing unit through the wireless communication by exercising the right granted by the grant unit in response to the request.

15. The image processing system according to claim 14, wherein the image processing apparatus includes a notification execution unit that executes at least one of a notification to the communication device that the connection is cut off when a connection state of the wireless communication to the communication device transits from a state where the connection is established to a state where the connection is cut off, and a notification to the communication device that the connection is established when the connection state transits from a state where the connection is cut off to a state where the connection is established, and
the communication device includes a display unit that displays information indicating that the connection is cut off when the communication device is notified, from the notification execution unit, that the connection is cut off, and displays information indicating that the connection is established when the communication device is notified, from the notification execution unit, that the connection is established.

16. A communication device comprising:
a request unit that requests the right from the image processing apparatus according to claim 1;
an acceptance unit that accepts the right granted by the grant unit in response to the request made by the request unit;
an exercise unit that exercises the right accepted by the acceptance unit; and
a receiving unit that receives the image information transmitted from the providing unit through the wireless communication by exercising the right by the exercise unit.

17. The communication device according to claim 16, further comprising:
a display unit that displays information indicating that the connection is cut off when the communication device is notified that the connection is cut off, and displays information indicating that the connection is established when the communication device is notified that the connection is established, the communication device receiving at least one of a notification that the connection is cut off when a connection state of the wireless communication to the image processing apparatus transits from a state where the connection is established to a state where the connection is cut off, and a notification that the connection is established when the connection state transits from a state where the connection is cut off to a state where the connection is established.

18. A non-transitory computer readable medium storing a program causing a computer that controls an image processing apparatus including a readout unit reading out an image to function as:
a grant unit that grants a right to receive image information provided to a communication destination through a wireless communication using a second communication unit, in response to a request from the communication destination, the image information representing the image read out by the readout unit; and
a providing unit that provides the image information by transmitting the image information to the communication destination through the wireless communication, when the communication destination exercises the right granted by the grant unit in a state where a wireless communication connection to the communication destination is established,
wherein the grant unit grants the right by transmitting the right to the communication destination through the wireless communication when the wireless communication connection to the communication destination is established, and grants the right by transmitting the right to the communication destination using a first communication unit different from the second communication unit used in the wireless communication when the wireless communication connection to the communication destination is not established,
wherein the second communication unit is a communication unit that performs the wireless communication by ad hoc mode.

19. A non-transitory computer readable medium storing a program causing a computer to function as:
a request unit that requests the right from the image processing apparatus according to claim 1;
an acceptance unit that accepts the right granted by the grant unit in response to the request made by the request unit;
an exercise unit that exercises the right accepted by the acceptance unit; and
a receiving unit that receives the image information transmitted from the providing unit through the wireless communication by exercising the right by the exercise unit.

20. The image processing apparatus according to claim 1, further comprising:
a determination unit that determines whether the wireless communication connection to the communication destination is established using the second communication unit.

* * * * *